April 7, 1936.  L. POHL  2,036,956

DIRECTIONAL SIGNAL AND TAILLIGHT FOR MOTOR VEHICLES

Filed July 17, 1935    2 Sheets-Sheet 1

Leo Pohl
INVENTOR

BY *Victor J. Evans & Co.*
ATTORNEY

April 7, 1936.  L. POHL  2,036,956
DIRECTIONAL SIGNAL AND TAILLIGHT FOR MOTOR VEHICLES
Filed July 17, 1935   2 Sheets-Sheet 2
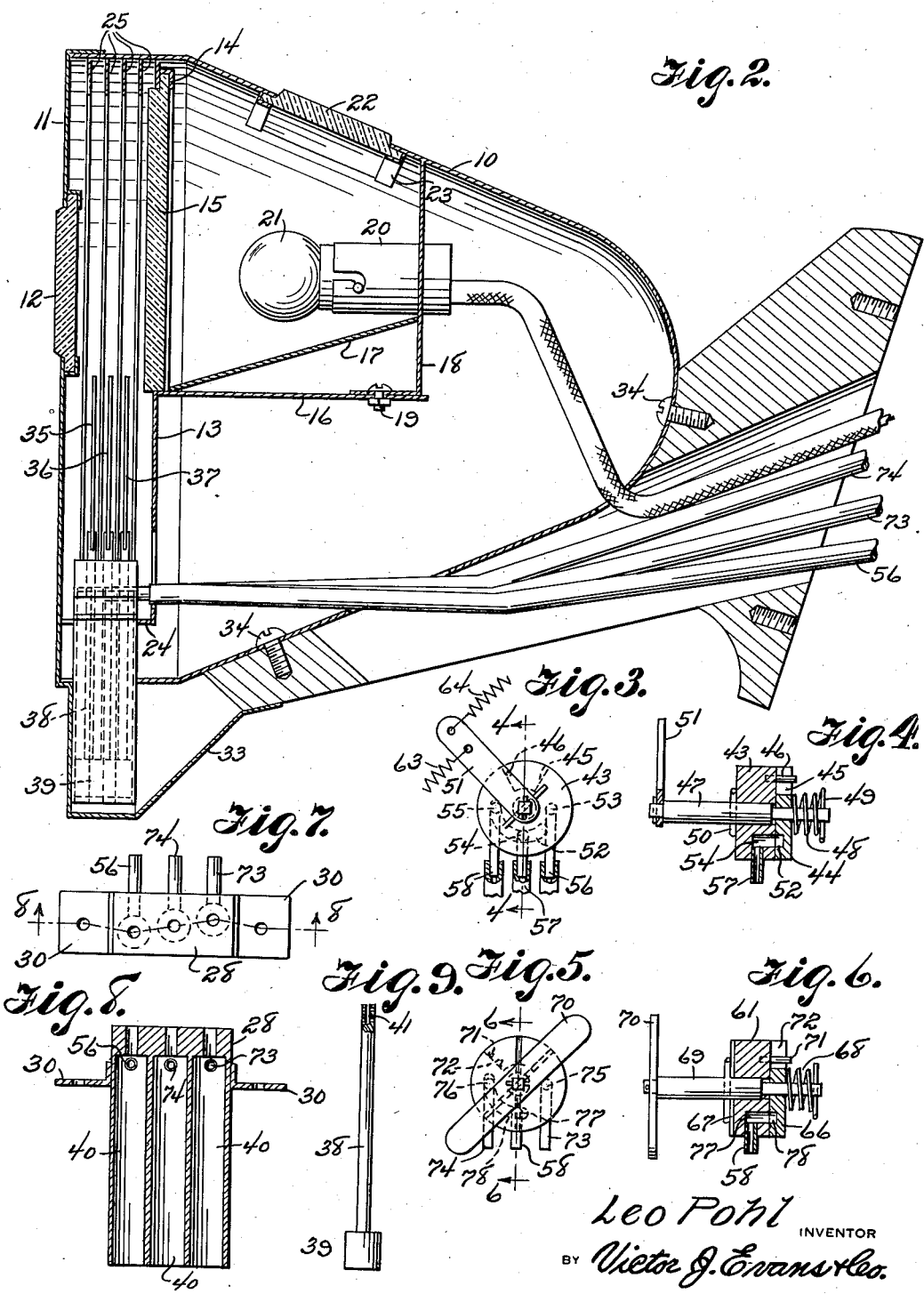
Leo Pohl INVENTOR
BY Victor J. Evans & Co.
ATTORNEY Patented Apr. 7, 1936

2,036,956

UNITED STATES PATENT OFFICE 2,036,956

DIRECTIONAL SIGNAL AND TAILLIGHT FOR MOTOR VEHICLES

Leo Pohl, Chicago, Ill.

Application July 17, 1935, Serial No. 31,898

6 Claims. (Cl. 116—36)

This invention relates to directional signals and tail lights for motor vehicles and has for an object to provide an improved and simplified appliance in which the operation of the back and turn signals will be controlled from the driver's seat, the signal devices being so constructed as to be clearly visible by day and illuminated by night.

A further object is to provide a combined directional signal and tail light in which the signal plates are operated by suction from the motor intake and are controlled by a valve operated by the brake pedal and another valve manually operated by the driver and preferably located on the post of the steering wheel.

A still further object is to provide an appliance of this character in which a plate disposed in rear of the face of the lamp casing carries a red pane, a reflector, and a signal lamp constituting the red tail signal used on automobiles at the rear, the plate also carrying guide rings for the selectively slidable signal plates, and also carrying the piston cylinders whereby a more efficient assembly of the parts will be promoted and breakage due to vibration practically eliminated.

A further object is to provide an appliance of this character which will be formed of a few, strong, simple, and durable parts, which may be easily manufactured, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 2 is a longitudinal sectional view through the device taken on the line 2—2 of Figure 1.

Figure 3 is a plan view of the brake pedal controlled valve.

Figure 4 is a cross sectional view taken on the line 4—4 of Figure 3.

Figure 5 is a plan view of the manually controlled valve.

Figure 6 is a cross sectional view taken on the line 6—6 of Figure 5 with the valve stem in elevation.

Figure 7 is a plan view of the cylinder chest.

Figure 8 is a cross sectional view taken on the line 8—8 of Figure 7.

Figure 9 is a detail elevation of one of the pistons.

Figure 1:
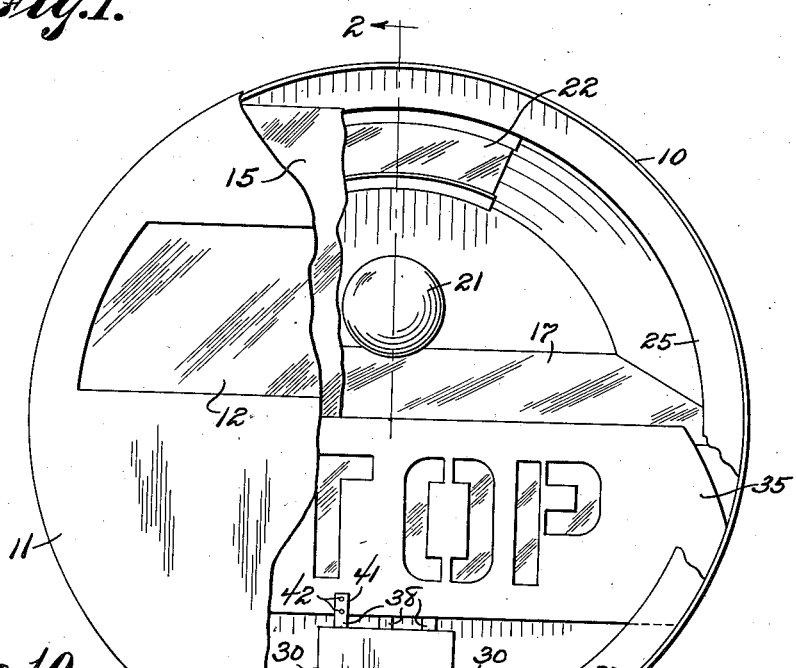
Figure 1 is a front elevation of a combined signal and tail light constructed in accordance with the invention, with parts broken away.

Referring now to the drawings in which like characters of reference designate similar parts in the various views, the casing 10 of the signal device is preferably formed of metal and is provided in the front face 11 toward the top with a window 12. A metal plate 13 is disposed in the casing parallel with the face 11 of the casing and is provided with a frame 14 which receives a pane 15 preferably of red glass, which registers with the window 12 and when not covered by a signal plate, serves as the conventional red tail signal used on automobiles.

The plate 13 is provided with a rear extension 16 to which is secured a reflector having an inclined reflecting wall 17 and a vertical rear wall 18 which is bolted to the extension as shown at 19. A conventional lamp socket 20 and lamp bulb 21 are carried by the reflector in rear of the pane 15. A transparent glass window 22 is carried in a suitable frame 23 in the casing above and in rear of the bulb and permits reflected light rays to illuminate the license plate, not shown.

The plate 13 is provided with a forward extension 24 which extends to the front face 11 of the casing below the window 12 and pane 15 and a plurality of arcuate spaced guides 25 are arranged to conform to the curvature of the casing above the extension. These guides are carried by and secured to the extension by means of tongues 26 on the ends of each guide fitting into openings 27 formed in the extension as best shown in Figure 1. The extension 24 also carries a cylinder chest 28 which is substantially oblong in longitudinal and in cross section and projects through an opening 29 formed in the extension. Angular brackets 30 are secured to the chest and are bolted as shown at 31 or otherwise secured to the extension. The chest also extends downwardly through an opening 32 in the casing and projects into the hollow end of a bracket 33 which is secured to the casing by screws 34 as shown in Figure 2 and may be mounted on a stationary part at the rear of the motor vehicle in any preferred manner.

Figures 10, 11:
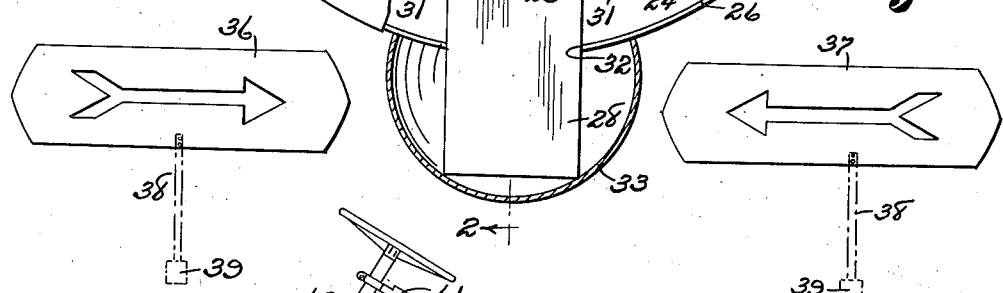
Figure 10 is a reduced front elevation of the right turn signal plate.
Figure 11 is a reduced front elevation of the left turn signal plate.

Between each pair of the guides 25 there is mounted a signal plate, there preferably being three of these plates of the general shape shown in Figures 10 and 11 and comprising a plate 35 of metal in which is stenciled or otherwise cut out the word "stop", and similar plates 36 and 37 having cut out arrows designating respectively "right" and "left" turns. Each plate is secured to the piston rod 38 of a piston 39 which is received in a corresponding open bottom cylinder 40 formed in the cylinder chest. The piston rod may be bifurcated as shown at 41 in Figure 9 to receive the associated signal plate and rivets 42 or other suitable connectors may be passed through the bifurcation and the plate to rigidly secure the plate to the piston rod. Normally the piston is supported upon the bottom of the corresponding cylinder and the length of the piston rod is such as to dispose the associated signal plate below the registering window 12 and pane 15 as best shown in Figure 2. The pistons are selectively subjected to suction from the motor intake to move the signal plates into the space between the pane and the window so that the sign on the selected plate will be illuminated to indicate the intentions of the driver, as will be presently described.

It will be here pointed out that preferably each signal plate is painted or otherwise colored black on the front face and white paper is preferably adhesively secured to the rear face of the plate to provide contrast between the indicia or signal character on the plate and the plate itself so that clearly visible signals will be produced during daylight. The projected rays from the lamp 23 are colored by the red pane 15 at night to correspondingly color the paper backing of the plate and produce clear signals after dark.

By referring now to Figure 3, wherein is shown the brake pedal controlled valve, the valve is shown to comprise discs 43 and 44 one of which is provided with a cut out segment 45 which receives a stop pin 46 carried by the other disc. The discs are concentrically mounted upon a valve stem 47 and pressed together by a helical spring 48 which is mounted on the valve stem and bears at one end against an abutment pin 49 carried by the stem and bears with its opposite end against the disc 44. The disc 43 is held in position by an abutment pin 50. A crank 51 is fixed to the valve stem for rotating the disc 44 clockwise or counterclockwise until one wall of the cut out segment 45 engages the stop pin 46.

The movable disc 44 is provided with an arcuate slot 52 which is disposed concentric to the valve stem and on the opposite side thereof from the segment 45. The mating disc 43 is provided with three ports 53, 54, and 55 which communicate with tubes 56, 57, and 58. The tube 57 communicates with the intake manifold 59 of the motor 60 as shown in Figure 12 and the suction of the intake operates through the arcuate slot 52 shown in Figure 3 and through the tube 58 which latter is conducted to a valve 61 similar to the one just described but located on the steering column 62 as shown in Figure 12.

The crank 51 is held in the position shown in Figure 3 by means of balanced springs 63 and 64, the spring 63 being secured to any stationary part of the vehicle. The spring 64 is secured to the brake pedal 65. When the brake pedal is depressed the spring 64 is relieved of its tension allowing the spring 63 to contract and pull the crank 51 and disc 44 until the stop pin 46 lodges against the opposite wall of the segment in which position of the disc 44 the arcuate slot 52 is disconnected from the tube 58 and cross connects the tubes 57 and 56, the latter being connected to the cylinder associated with the "stop" signal plate so that suction will be exerted upon the piston in the cylinder and will pull up the piston to elevate the "stop" signal plate to registration with the window 12. Upon the brake pedal being released the spring 64 will again be placed under tension and return the parts to initial position.

Figure 12:
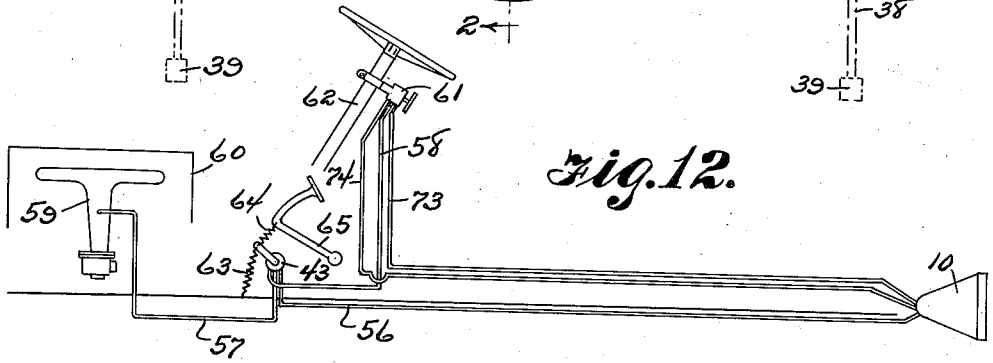
Figure 12 is a diagrammatic view showing the control valves and tubes for operating the device from the intake of the vehicle motor.

Referring more particularly to Figures 5, 6, and 12 the steering column valve 61 is a duplicate in all respects to the brake pedal controlled valve above described so that a brief description will suffice. The movable disc 66 is pressed against the fixed disc 67 by a helical spring 68 and is moved manually by a stem 69 having a grip 70 at the end opposite the spring, movement of the disc 66 being limited by contact of a stop pin 71 with the walls of a cut out segment 72 in the movable disc 66.

Two tubes 73 and 74, and the above mentioned tube 58 enter the fixed disc 67 and open through the face of the disc through ports 75, 76, and 77 respectively as shown in Figure 5.

In the normal or neutral position of the steering column valve 61 the grip 70 extends diametrically across the valve preferably in a horizontal position and the stop pin 71 is located midway between the walls of the cut out segment 72. When the grip 70 is turned by the driver to dispose the pin 71 against one wall of the cut out segment, the tube 58 will be cross connected by an arcuate slot 78 in the movable disc 66 to the tube 74 so that the suction from the motor intake will operate through the tube 74, as shown in Figure 5, which tube enters the cylinder of the "right" signal plate piston above the piston and draws up the piston to elevate the signal plate into registration with the window 12. When the grip 70 is turned by the driver from neutral position until the stop pin 71 engages the opposite wall of the cut out segment from the position shown in Figure 5 the tube 58 will be cross connected by the arcuate slot 78 to the tube 73 which latter enters the cylinder associated with the "left" turn signal plate 37 whereupon the suction will raise the piston and elevate the "left" turn signal plate into registration with the window 12.

From the above description it is thought that the construction and operation of my invention will be fully understood without further explanation.

What is claimed is:

1. A directional signal comprising a casing, a plate in the casing parallel with the face of the casing, registering windows in said face and said plate, a rear extension on the plate, a reflector carried by the extension in rear of the window in the plate, a lamp in the reflector, a forward extension on the plate, a plurality of cylinders carried by the forward extension below the windows, pistons in the cylinders, means for selectively subjecting the pistons to suction to move the pistons in the cylinders, and signal plates normally disposed below the windows and movable upward by the pistons into the space between said windows for indicating the intention of the driver.

2. A directional signal comprising a casing, a plate in the casing parallel with the face of the casing, registering windows in said face and said plate, a rear extension on the plate, a reflector carried by the extension in rear of the window in the plate, a lamp in the reflector, a forward extension on the plate, a plurality of cylinders carried by the forward extension below the windows, pistons in the cylinders, suction tubes entering the cylinders above the pistons, valves controlling the suction tubes to selectively move the pistons in the cylinders, and signal plates normally disposed below the windows and movable upward by the pistons into the space between the windows for indicating the intention of the driver.

3. A directional signal comprising a casing, a plate in the casing parallel with the face of the casing, registering windows in said face and said plate, a rear extension on the plate, a reflector carried by the extension in rear of the window in the plate, a lamp in the reflector, a forward extension on the plate, a plurality of cylinders carried by the forward extension below the windows, pistons in the cylinders, means for selectively subjecting the pistons to suction to move the pistons in the cylinders, spaced parallel arcuate guides in the casing between the windows having the ends secured to said forward extension, and signal plates disposed below the windows between the guides and movable upward by the pistons into the space between said windows for indicating the intention of the driver.

4. A directional signal comprising a casing, a plate in the casing parallel with the face of the casing, registering windows in said face and said plate, a rear extension on the plate, a reflector carried by the extension in rear of the window in the plate, a lamp in the reflector, a forward extension on the plate, a plurality of cylinders carried by the forward extension below the windows, pistons in the cylinders, means for selectively subjecting the pistons to suction to move the pistons in the cylinders, and signal plates normally disposed below the windows and movable upward by the pistons into the space between said windows for indicating the intention of the driver, each signal plate being opaque and having a cut out signal character backed by a translucent backing.

5. A directional signal for motor vehicles comprising a signal lamp casing, signal plates in the casing, cylinders associated with the plates, pistons in the cylinders connected to the plates for moving the plates into signal position, suction tubes entering the cylinders above the pistons for moving the pistons upwardly to operative position, a brake pedal, a disc valve adjacent to the brake pedal, balanced springs connected to the brake pedal and to a stationary part of the vehicle and normally holding the valve closed, and ports in the valve controlling the suction tubes, braking movement of the pedal releasing one of the springs from tension and permitting the other spring to open the valve to move one of the pistons to operative position.

6. A directional signal for motor vehicles comprising a signal lamp casing, signal plates in the casing, cylinders associated with the plates, pistons in the cylinders connected to the plates for moving the plates into signal position, suction tubes entering the cylinders above the pistons for moving the pistons upwardly to operative position, a brake pedal, a valve adjacent to the brake pedal, balanced springs connected to the brake pedal and to a stationary part of the vehicle and normally holding the valve closed, ports in the valve controlling the suction tubes, braking movement of the pedal releasing one of the springs from tension and permitting the other spring to open the valve to move one of the pistons to operative position, and a manually controlled valve having ports controlling certain of the suction tubes for selectively actuating certain of the pistons to move their associated signal plates to signalling position.

LEO POHL.